Patented May 10, 1927.

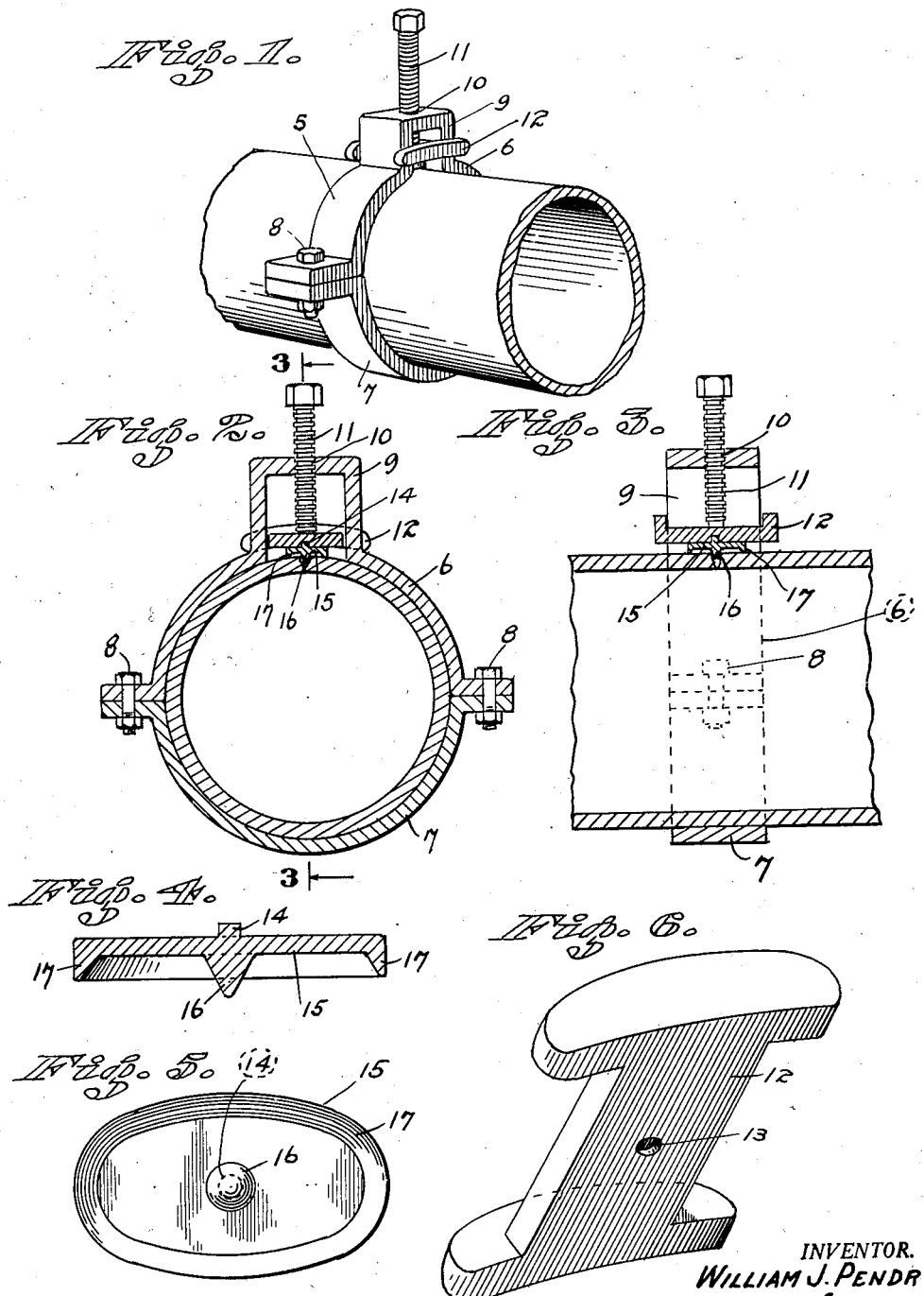

1,627,995

UNITED STATES PATENT OFFICE.

WILLIAM J. PENDRY, OF MARTINEZ, CALIFORNIA.

PIPE-SEALING DEVICE.

Application filed December 7, 1925. Serial No. 73,755.

My invention relates to leak sealing means for pipes or other liquid conduits, receptacles or the like, and has for its primary object the provision of means of this character which will effectively cause a leak to be properly sealed without requiring that the flow of liquid be checked or cut off during the sealing operation.

A further object of the invention is to provide means of this character which will be highly effective and capable of being quickly associated with a pipe or object so that its use will be very desirable in emergency instances.

A still further object of the invention is to provide leak sealing means which will furnish a seal for a leak and an auxiliary seal at joints around the leak so that said means will be very positive of action.

With the above and other objects in view which will appear as the nature of the invention is better understood, the same consists in the improved construction and novel arrangements of parts which will hereinafter be fully described and particularly pointed out in the claims.

In the accompanying drawings has been illustrated a single and preferred form of the invention, it being, however, understood that no limitations are necessarily made to the precise structural details therein exhibited but that changes, alterations and modifications within the scope of the claims may be resorted to when desired.

Figure 1 is a perspective view of a pipe with my device attached thereto;

Figure 2 is a vertical cross-section of the device applied to a pipe;

Figure 3 is a cross-section of Figure 2 taken on the line 3—3 thereof;

Figure 4 is an enlarged cross sectional detail of a lead seal;

Figure 5 is an enlarged plan view of Figure 4;

Figure 6 is an enlarged perspective view of the sliding pressure plate.

In carrying the invention into practice, I can employ any suitable well known means or support which will cause my improved seal to adapt itself to certain conditions and accommodated with respect to a leak in a pipe to properly close same. The support shown herein consists of a clamp 5 having mating sections 6 and 7 bolted or otherwise secured together at 8.

The section 6 has a U-shaped branch 9 provided with a threaded opening 10 to accomodate a clamp screw 11, the latter bearing against a sliding pressure plate 12. This plate slides in the branch 9 as a guide so that it does not turn when the screw is operated.

The plate 12 has a perforation 13 therein and fitting same is the stem 14 at one side of a soft body 15, preferably lead. This body is formed at its opposite side with a conical leak sealing portion 16, and surrounding said portion and formed as part of the body is an annular skirt 17 of less depth than the length of the portion 16.

When using the device, and assuming that the support 5 is applied to the pipe as stated herein, the apex of the cone 16 is centered with respect to the hole to be sealed and the screw 11 controlled to bring pressure to bear against the entire body 15. This crowds the cone into the opening forming the leak until the opening is effectively sealed. Progressively with this operation, the skirt portion 17, whose walls are gradually reduced toward their free edges, comes against the pipe at points around the opening and the walls are finally squashed or somewhat flattened out to thereby provide an auxiliary seal.

The device can be applied quickly to a pipe and a leak instantly and thoroughly sealed without cutting off the liquid pressure within the pipe. The soft sealing body 15 may be of any suitable size to meet given requirements, and one of a certain size may be substituted for one of another size. In other words the support 5 is made to interchangeably accommodate itself to sealing bodies of different sizes.

I claim:

1. As a new article of manufacture, a leak sealer formed of soft metal comprising a body having a centrally disposed conical portion on one side and a skirt thereabout.

2. As a new article of manufacture, a leak sealer formed of soft metal comprising a body having a centrally disposed conical portion on one side, a skirt thereabout, and a centrally disposed stem on the opposite side of said body.

WILLIAM J. PENDRY.